Feb. 6, 1973   FMIHIRO USHIJIMA   3,714,847

HYDRAULIC CONTROL SYSTEM FOR AUTOMATIC TRANSMISSIONS

Filed Feb. 10, 1971   9 Sheets-Sheet 1

INVENTOR

FMIHIRO USHIJIMA

BY McGlew + Tuttle

ATTORNEY

United States Patent Office 3,714,847
Patented Feb. 6, 1973

3,714,847
HYDRAULIC CONTROL SYSTEM FOR AUTOMATIC TRANSMISSIONS
Fmihiro Ushijima, Toyota, Japan, assignor to Toyota Jidosha Kogyo Kabushiki Kaisha, Toyota-cho, Aichi-ken, Japan
Filed Feb. 10, 1971, Ser. No. 114,178
Claims priority, application Japan, Feb. 13, 1970, 45/12,896
Int. Cl. F16h 3/44
U.S. Cl. 74—753
10 Claims

ABSTRACT OF THE DISCLOSURE

A hydraulic control system for automatic transmissions is applied to a multistage change gear mechanism including hydraulically actuated friction elements including clutches and brakes, selectively cooperable with components of the mechanism to establish the input-output gear ratio, and includes an accumulator which lessens the shock, resulting from the pressure changes during shifting, by controlling the transient pressure change of the hydraulic fluid supplied to hydraulic servos actuating the friction elements. Shift valves, operable in accordance with engine output and vehicle speed, control the supply and exhaust of hydraulic fluid relative to the servos. A reciprocable piston divides the accumulator into first and second chambers, with the first chamber controlling the pressure change to the hydraulic servos during shifting and the second chamber controlling operation of the accumulator. A return valve exhausts the second chamber of the accumulator in connection with operation of the shift valve upon shifting. The accumulator piston returns to its initial position after completion of shifting.

SUMMARY OF THE INVENTION

This invention relates to a hydraulic control system for automatic transmissions wherein shifting shocks, caused by the variation of the output torque at the time of shifting, are lessened by providing an accumulator within an automatic transmission.

The variation of the torque of the output shaft at the time of shifting is influenced by the material of the friction members of the friction engaging units, the characteristic of the operating fluid, etc. The biggest factor affecting the variation of the torque is the change in the pressure of the operating fluid to be supplied into the servo mechanisms designed to operate the friction engaging members. In order to lessen the shock, many methods have been proposed to control the transient change in the pressure of the operating fluid arising at the time of shifting. Most of such methods utilize an accumulator. Fundamentally, to lessen the shocks during shifting, it is necessary to accurately control the transient pressure change caused at the time of shifting. This requirement is most reliably fulfilled by the employment of an accumulator. However, the greatest drawback of the accumulator is that it requires a far greater volume to install compared with other control devices. Now that multi-stage automatic transmissions, such as three- or forur-speed transmissions are most widely used, the number of accumulators required should be greately increased. Consequently, it has become impossible to install all accumulators required in the interior of the control device.

In view of the above, this invention is designed to control the transient change in the pressure of operating fluid, caused at the time of shifting, by a single accumulator provided in advance of the shift valves and combined with another valve. This invention is designed to eliminate the above-described shortcoming by reducing the volume of the accumulator greatly as compared with conventional accumulators.

DESCRIPTION OF PREFERRED EMBODIMENTS (I) Construction of a transmission

Figure 1:
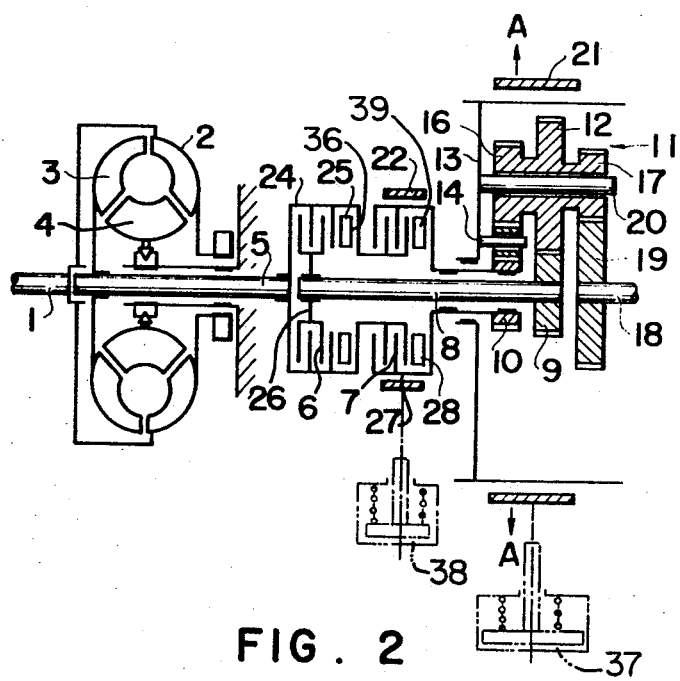
FIG. 1 is a schematic drawing of an example of a transmission embodying the system according to this invention.

The construction of a transmission will be described with reference to a three forward speeds and one reverse speed automatic transmission with a torque converter, which is illustrated in FIG. 1 as a representative example. FIG. 1 illustrates schematically a fluid-type automatic transmission having three forward speeds and one reverse speed.

A pump impeller 2 is directly coupled to an engine crank shaft 1. Engine power is transmitted by pump impeller 2 through oil to a turbine runner 3. The oil is guided by a stator 4 and is returned again to the pump impeller 2. Torque is continuously obtained at the turbine shaft 5 by the cycle oil flow. The torque of the turbine thus obtained is transmitted from the turbine shaft 5 to a change gear mechanism provided a the rear of the torque converter. Thus, as is well known, a speed change mechanism for three forward speeds and one reverse speed is provided by a planetary gear mechanism by controlling multiple disc clutches 6, 7 and brake bands 21, 22 by means of a required servo hydraulic pressure.

Next, the construction of the change gear mechanism provided at the rear of the torque converter will be described. The turbine runner 3 is coupled to the turbine shaft 5, thus serving as an input shaft to the planetary gear mechanism, and turbine shaft 5 is splined onto a drum 24. The multiple disc clutch 6 which is engaged or released by a hydraulically-operated piston 25 through a back spring (to be referred to as the "front clutch" hereinafter) is installed in the drum 24. A hydraulic servo 36, comprising drum 24 and piston 25, engages clutch 6 when the servo is supplied with fluid under pressure and, when fluid is exhausted, releases clutch 6 from engagement. Supply and exhaust of fluid is controlled by a hydraulic control system described hereinafter. The drive plates of front clutch 6 are splined onto the drum 24 at the outer periphery thereof. The driven clutch discs are splined onto a hub 26 at the inner periphery thereof so as to rotate with hub 26. The hub 26 is splined onto an intermediate shaft 8. As illustrated, the front clutch drum 24 is splined to the drive plates of a multiple disc clutch 7 (to be referred to as the "rear clutch" hereinafter), and they rotate together. The driven plates of the rear clutch 7 are splined onto a clutch drum 27 at the outer periphery thereof, and clutch 7 is engaged or released by means of a piston 28. The supply of fluid under pressure to a hydraulic servo 39, constituted by drum 27 and piston 28, is also controlled by the mentioned hydraulic control system.

Figure 2:
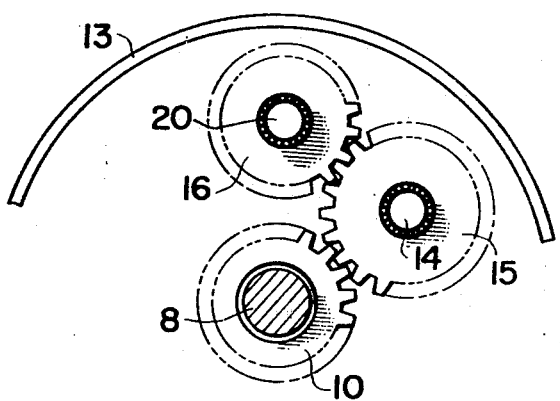
FIG. 2 is a sectional view taken along the line A—A of FIG. 1.

The intermediate shaft 8, onto which the hub 26 of the front clutch 6 is splined, is provided with an input sun gear 9 at the rear end thereof. The rear clutch drum 27 is fixedly connected with a reverse sun gear 10 through a suitable bearing. The input sun gear 9 is meshed with gears 12 of pinions 11 of the planetary gear trains provided in an appropriate number (for example, 2 or 3 sets) around its periphery. The reverse sun gear 10 is mesh with an idler gear 15 (shown in FIG. 2) that is rotatable on a pin 14 fixed into a carrier 13. Idler gear 15 is meshed with a gear 16 on said pinion 11.

A gear 17 at the rearmost end of the pinion 11 is meshed with a gear 19 of an output shaft 18 of the transmission. The pinions 11 having the gears 16, 12 and 17 are mounted on the carrier 13 by pins 20. Also, the pinion (idler gear) 15 is mounted on the carrier 13 by the pin 14 as described above. The carrier 13 is provided with the brake band 21 (to be referred to as the "rear brake band" hereinafter), and is held stationary or released by applying or releasing rear brake band 21. Rear brake band 21 is hydraulically actuated by a hydraulic servo 37. Similarly, the band 22 (to be referred to as the "front brake band" hereinafter) is provided at the outer periphery of the rear clutch drum 27. The drum 27, that is, the sun gear 10, is fixed or released by applying or releasing front brake band 22. Front brake band 22 is hydraulically actuated by a hydraulic servo 38.

Next, the operating condition to be obtained from the above-described construction for three forward speeds and one reverse speed will be described hereinafter.

First speed.—The front clutch 6 and the rear brake band 21 are actuated. Under this condition, the rotation of the turbine shaft 5 is transmitted through the front clutch 6 to the input sun gear 9. As the carrier 13 is held stationary by the rear brake band 21, the pins 20 are also held stationary. The rotation thus transmitted is decelerated and transmitted from the gears 9 through the gear 12 and then the gears 17 to the gear 19 of the output shaft 18 in the same manner as in conventional gear trains.

Second speed.—The front clutch 6 is held engaged, but the rear brake band 21 is released and the front brake band 22 is actuated. Thus, the turbine shaft 5 rotates with the input sun gear 9, but the clutch drum 27, and consequently the reverse sun gear 10, are held stationary by the action of the front brake band 22. Under this condition, the rotation of the turbine shaft 5 is transmitted to the input sun gear 9, and the pinions 11 rotate in the direction opposite (counterclockwise) to the direction of rotation of the turbine shaft 5 (clockwise) by the action of sun gear 9. This motion tends to cause the gears 15 to to rotate clockwise through the gear 16. However, the gear 10 meshed with the gear 15 is fixed, and therefore the pin 14 revolves clockwise. This revolving motion is applied to the input sun gear 9 that rotates with the turbine shaft 5 and to the gear 19 of the output shaft. The magnitude of this application is greater than at the input shaft side, because the number of teeth of the gears 12 is larger than that of the gears 17. Therefore, the angular velocity of the intermediate shaft 8 becomes greater than that of the output shaft 18. In other words, deceleration is performed.

Third speed.—The third speed is obtained by applying both front and rear clutches. As the input sun gear 9 rotates with the reverse sun gear 10, the entire planetary gear system rotates as a single unit. Consequently, the output shaft 18 rotates at the same speed with the turbine shaft 5.

Reversed speed.—The rear clutch 7 and the rear brake band 21 are operated. Thus, the carrier 13 is held stationary, and therefore the pins 14 and 20 are also held stationary. The rotation of the turbine shaft 5 is transmitted through the rear clutch 7 to the reverse sun gear 10, and then through the pinions 15 and 17 to the gear 19 of the output shaft 18. Thus, the rotation of the output shaft 18 is reversed.

(II) Hydraulic operation circuits

Figure 3:
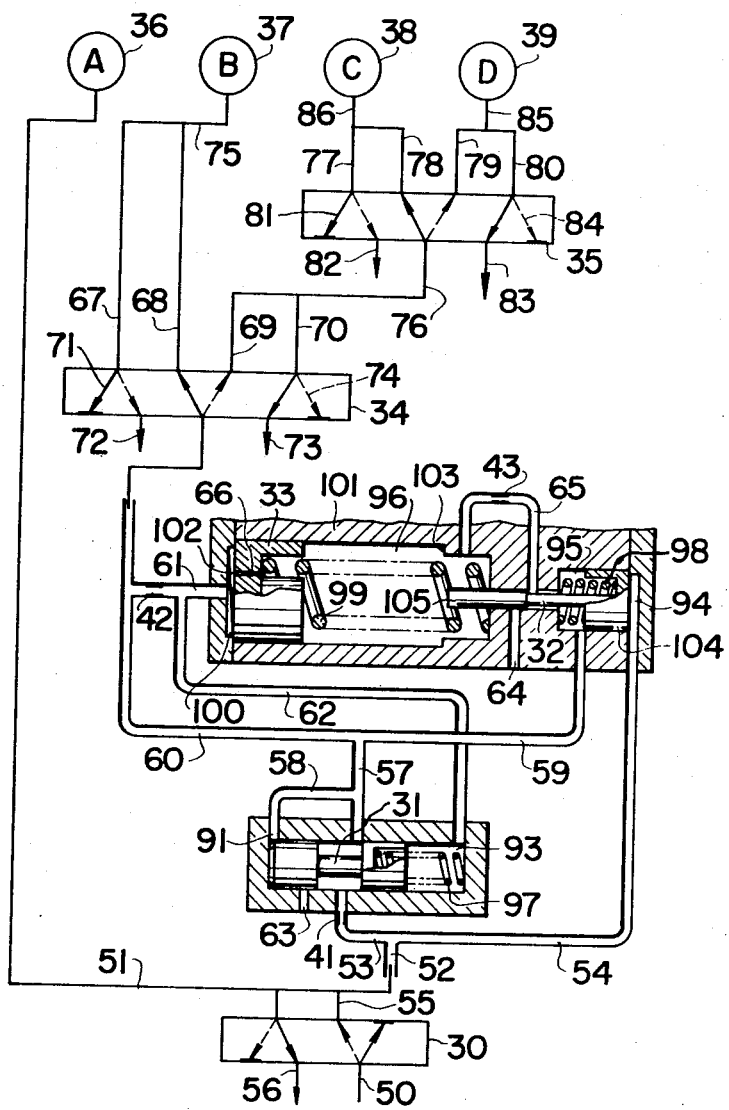
FIGS. 3 through 6 illustrate the operating conditions of the hydraulic operation circiut according to this invention in various ranges, FIG. 3 illustrating the operating condition in the N range, FIG. 4 illustrating the operating condition in first gear, FIG. 5 illustrating the operating condition in second gear and FIG. 6 illustrating the operating condition in third gear.

The hydraulic operation circuits according to this invention are illustrated in FIGS. 3 through 6. Generally, the automatic transmission is capable of selecting each of such ranges as P, R, N, D, etc., by means of a shift lever. In the P range, the output shaft is held stationary at the time of parking. R stands for reverse driving. In the N range, pressure is discharged from the servo of the front clutch, and therefore no torque is transmitted from the engine to the output shaft. The D range is necessary for running forward. In this range, the shift to the first, second or third gear is automatically performed. FIG. 3 illustrates the condition in the N range. The hydraulic oil regulated to the line pressure $P_0$ is supplied to a passage 50. A manual valve 30 closes the passage 50 in the N range. The pressure in passages 51 and 52 is discharged through a passage 56 of the manual valve 30. Consequently, the pressure in a servo 36 for operating the front clutch 6, a servo 37 for operating the rear brake band 21, a servo 38 for operating the front brake band 22 and a servo 39 for operating the rear clutch 7 is all discharged. When none of these servos is supplied with the hydraulic oil, the respective friction engaging units are released by means of a spring and the friction engaging units are engaged when hydraulic oil under pressure is supplied.

Figure 4:
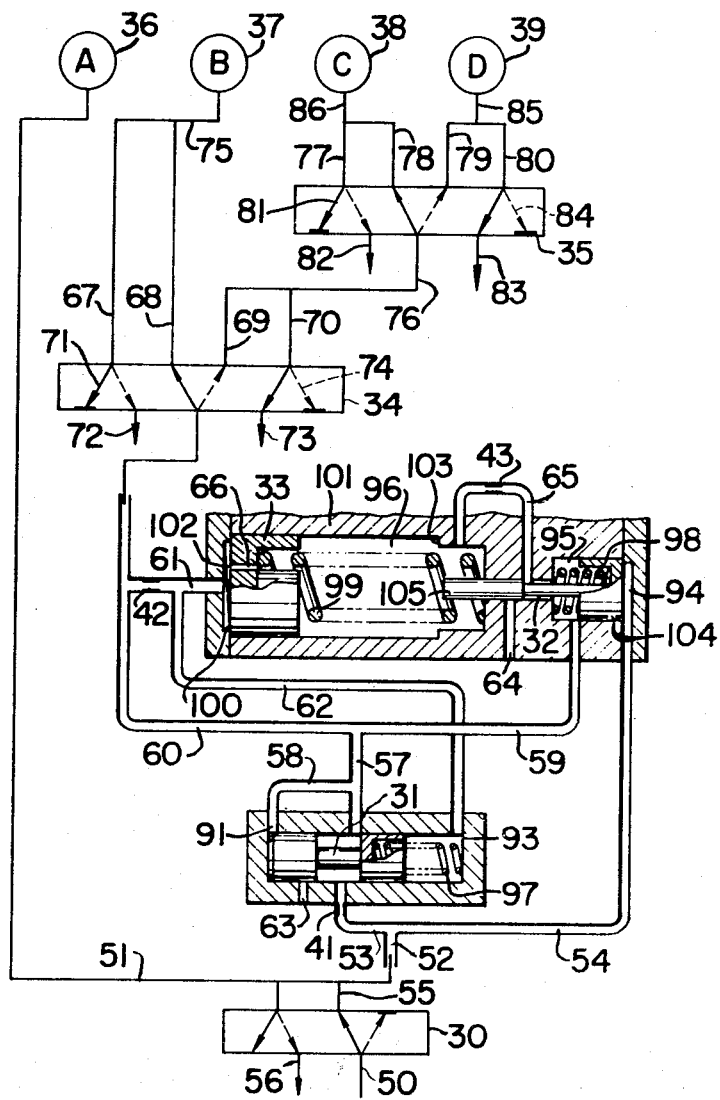

FIG. 4 shows the condition in the D range first gear. The hydraulic oil is supplied into the servo 36 of the front clutch and the servo 37 of the rear brake band by shifting the manual valve 30 from the N range to the D range. The hydraulic oil at the line pressure is supplied into the passages 51 and 52 by means of the manual valve 30. The servo 36 of the front clutch is supplied by the passage 51, thus engaging the friction engaging unit. The hydraulic oil in the passage 52 is directed through a pressure control valve 31 and passages 57 and 60 to a 1–2 shift valve 34 which is controlled by the vehicle velocity and the engine output. The passage 60 is connected to a passage 68 by means of the 1–2 shift valve 34. At this time, a passage 67 is closed and the pressure in a passage 69 is discharged from a passage 73 through a passage 70. Consequently, the hydraulic oil is supplied into the servo 37 of the reverse band or rear brake through the passages 68 and 75, thus obtaining the first gear. On the other hand, the pressure in the servos 38 and 39 is discharged. The line pressure $P_0$ is supplied into a pressure receiving chamber 100 to the left of an accumulator piston 33 of an accumulator 101, a pressure receiving chamber 94 of a pressure return valve 32 and a pressure discharging chamber 95 thereof through the passages 60 and 61, the passages 52 and 54 and the passages 57 and 59, respectively. Also, the line pressure $P_0$ is supplied into a pressure discharging chamber 96 to the right of the accumulator piston 33, and to a first pressure receiving chamber 91 and a second pressure receiving chamber 93 of the pressure control valve 31, through a passage 65, a passage 58 and a passage 62, respectively. The accumulator piston 33, the pressure return valve 32 and the pressure control valve 31 are pressed against the ends of the respective valve bodies by means of a spring 99, a spring 98 and a spring 97, respectively, as shown in FIG. 4.

Figure 5:
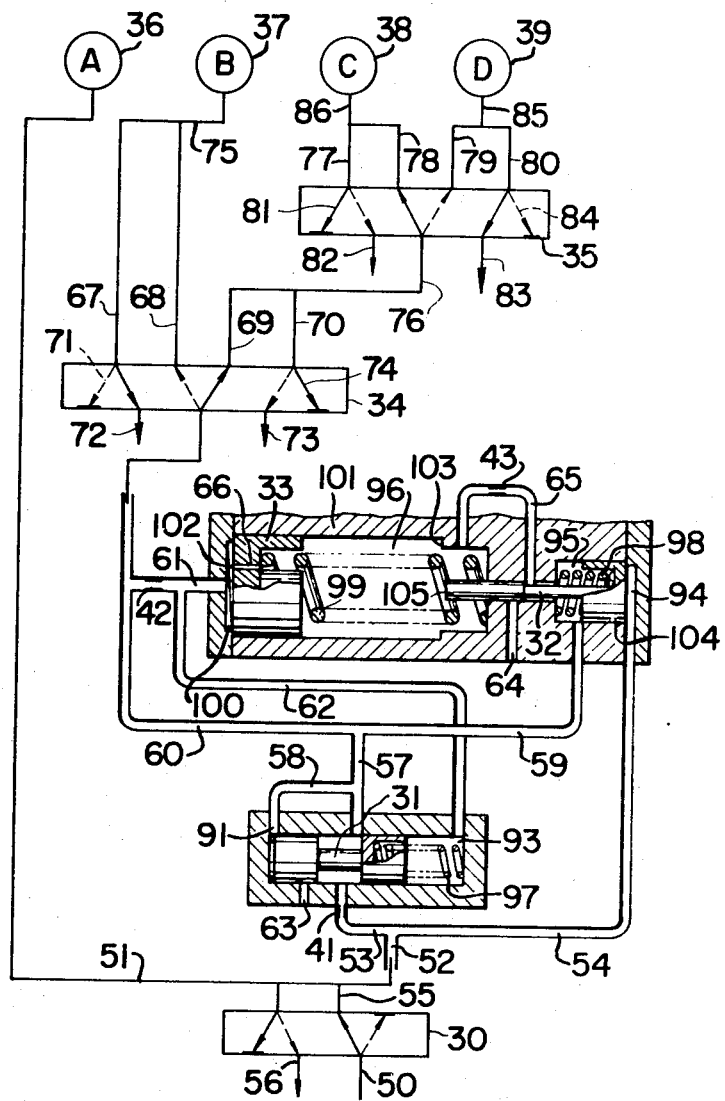

FIG. 5 illustrates the condition in the D range second gear. The shift from the first to the second gear is performed by the 1–2 shift valve 34. The supply of the hydraulic oil having the line pressure $P_o$ to the passage 60 to the 1-2 shift valve is accomplished in the same manner as in the case of the first gear. When the condition is shifted from the first to the second gear the 1-2 shift valve 34 connects the passage 60 to the passage 69. At the same time, a passage 70 is closed. The pressure in the passages 68 and 75 is discharged from a passage 72 through the passage 67. Consequently, the hydraulic oil having the line pressure $P_o$ is directed to a 2-3 shift valve 35 through the passages 69 and 76. The 2-3 shift valve 35 is controlled by the vehicle velocity and the engine output in the same manner as the 1-2 shift valve 34. Under this condition in the second gear, the 2-3 shift valve 35 connects the passage 76 to a passage 78. At the same time, a passage 77 is closed and the pressure in passages 79 and 85 is discharged from a passage 83 through a passage 80. Consequently, the hydraulic oil having the line pressure $P_o$ actuates the servo 38 of the front brake band through the passage 78 and a passage 86. At this time, the front clutch 6 is engaged along with the front brake band 22, thus obtaining the second gear. The pressure in the servos 37 and 39 is being discharged.

Figure 6:
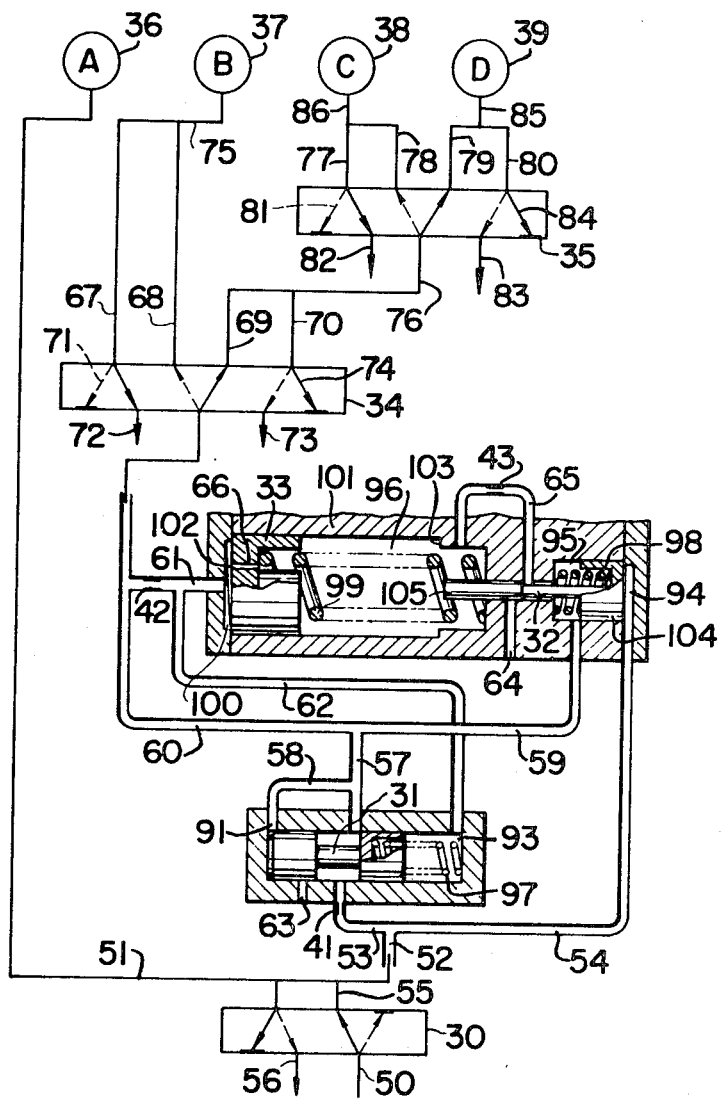

FIG. 6 illustrates the condition in the D range third gear. The shift from the second to the third gear is performed by the 2-3 shift valve 35. The supply of the hydraulic oil having the line pressure $P_o$ to the passage 76 to the 2-3 shift valve 35 is accomplished in the same manner as in the case of the second gear. When the condition is shifted from the second to the third gear, the 2-3 shift valve connects the passage 76 to the passage 79. At the same time, the passage 80 is closed and the pressure in the passages 78 and 86 is discharged from a passage 82 through the passage 77. Consequently, the hydraulic oil having the line pressure $P_o$ is supplied into the servo 39 of the clutch through the passages 79 and 85. Thus, the rear clutch is engaged to obtain the third gear. At this time, the pressure in the servos 37 and 38 is discharged.

(III) Performance of accumulator circuit at the time of shifting

Figure 7:
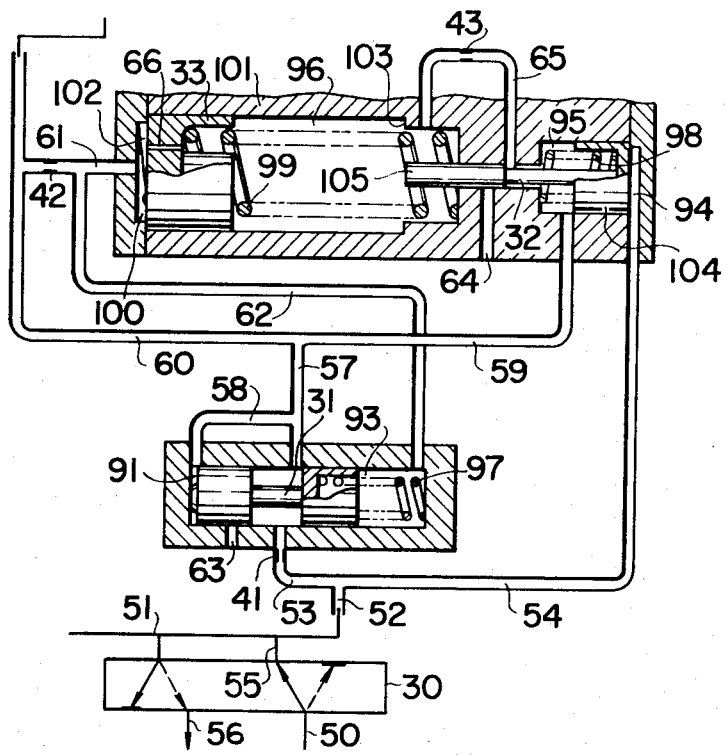
FIGS. 7 through 10 are operation circuit diagrams illustrating the time variation of the accumulator according to this invention.
Figure 8:
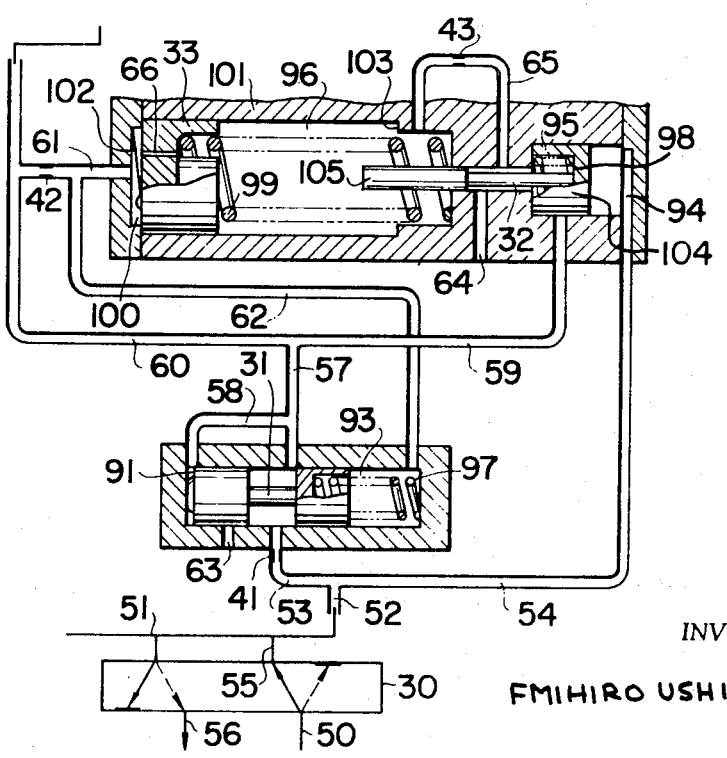
Figure 9:
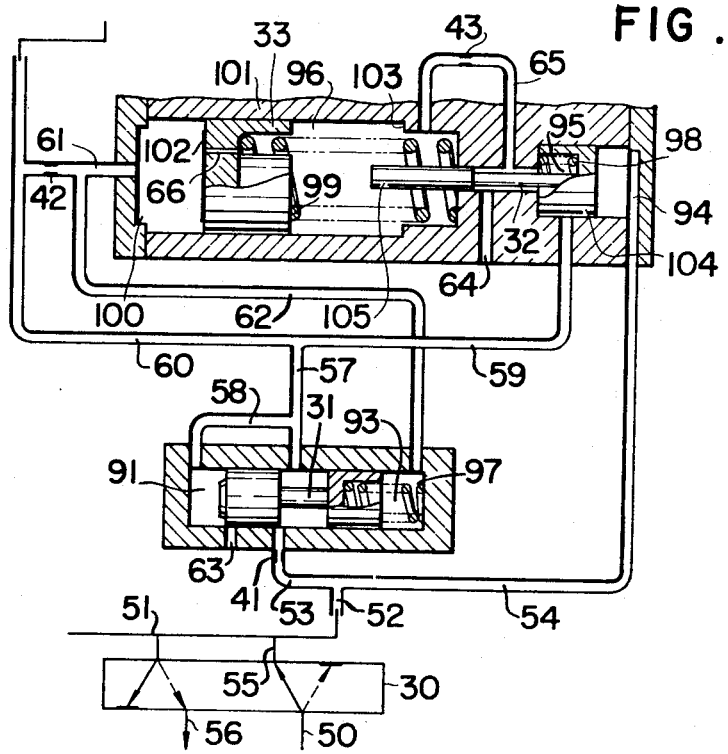

The performance of the accumulator circuit at the time of shifting from the N range to the D range first gear by means of the manual valve 30 will now be described in detail. In the N range, the pressure in the passage 52 is discharged by means of the manual valve 30. Therefore the pressure in the accumulator circuit comprising the pressure control valve 31, the pressure return valve 32 and an accumulator 101 is all discharged. Consequently, the pressure control valve 31, the pressure return valve 32 and the accumulator piston 33 are pressed to the ends of the respective valve bodies by the springs 97, 98 and 99, as shown in FIG. 7. The hydraulic oil having the line pressure $P_o$ is supplied into the passage 52 by moving the manual valve 30 to the D range. At the same time, the hydraulic oil is supplied through the passages 52 and 53 and an orifice 41 into the servo 37 of the rear brake band whcih has been released in the N range. At this time, the passage is throttled by means of the orifice 41, and therefore the pressure in the passage 53 is maintained equal to the line pressure $P_o$. However, the hydraulic pressure in the passage leading to the servo 37 of the rear brake band from the passages 57 and 60 is not immediately increased and is almost zero at that time. The hydraulic oil having the line pressure $P_o$ is supplied from the passage 54 into the pressure receiving chamber 94 of the pressure return valve 32. As the pressure discharging chamber 95 of valve 32 is connected to the passage 57 through the passage 59, the pressure of the hydraulic oil in the pressure discharging chamber 95 is almost zero. Consequently, at the moment when the manual valve 30 is shifted to the D range, the pressure to the right of pressure return valve 32 overcomes the bias of the spring 98 and valve 32 is pressed to the left as shown in FIG. 8. At this time, part of the hydraulic oil in the pressure discharging chamber 95 of the pressure return valve 32 is moved to the passage 61 from a passage 66 of the accumulator piston 33. The oil in the pressure discharging chamber 96 of the accumulator piston 33 is discharged from a passage 64 through the passage 65, and therefore the operation of the accumulator piston 33 becomes possible from this time on. As the hydraulic pressure in the passage 60 increases, it overcomes the bias of the spring 99 and accumulator piston 33 the spring 99 and accumulator piston 33 is started to operate. At this time a check valve 102 closes the passage 66 due to the difference between the pressure in the pressure receiving chamber 100 and that in the pressure discharging chamber 96. When accumulator piston 33 The man the white coat will get you watch out therein for starts to operate, a pressure difference is developed between the passage 60 and the passage 61 by means of an orfiice 42. Thus, the pressure in the passage 61 decreases below the pressure in the passage 60. The first pressure receiving chamber 91 of the pressure control valve 31 is connected through the passage 58 to the passages 57 and 60. The second pressure receiving chamber 93 is connected to the passage 61 through the passage 62. Therefore, the pressure in the first pressure receiving chamber 91 of the pressure control valve 31 is lower than that in the second pressure receiving chamber 93 when the accumulator piston 33 is operating. Consequently, the pressure control valve 31 further throttles the passage 53 as shown in FIG. 9. This serves to further throttle the passage during the operation of the accumulator, and therefore it is possible to reduce the size of the accumulator. At this time, the relation between the hydraulic control pressure of the pressure control valve 31, that is, the hydraulic pressure $P_c$ kg./cm.$^2$ to be supplied into the servo, the hydraulic pressure $P_a$ kg./cm.$^2$ in the passage 61, that is, the pressure receiving chamber 100 of the accumulator, the cross sectional area $A_{31}$ cm.$^2$ of the pressure control valve 31 and the force $K_{97}$ kg. of the spring 97 is expressed by the following formula.

$$P_c = P_a + (K_{97}/A_{31}) \quad (1)$$

The relationship between the force $K_{99}$ of the spring 99 of the accumulator and the cross sectional area $A_{33}$ cm.$^2$ of the accumulator piston 33 is given by $P_a = K_{99}/A_{33}$. Consequently, the hydraulic pressure $P_c$ to be supplied into the servo during the operation of the accumulator is given as follows.

$$P_c = (K_{99}/A_{33}) + (K_{97}/A_{31}) \quad (2)$$

Figure 10:
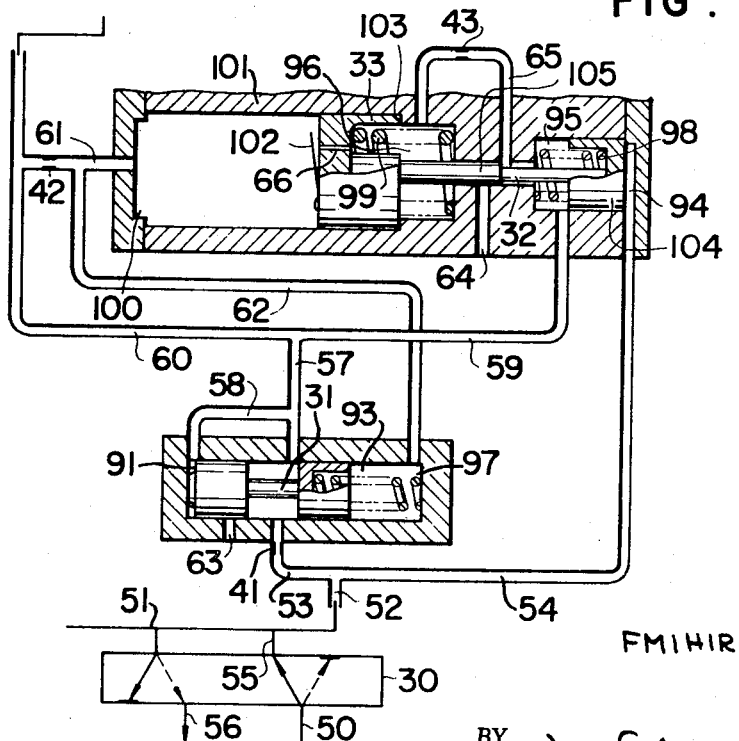
Figure 11:
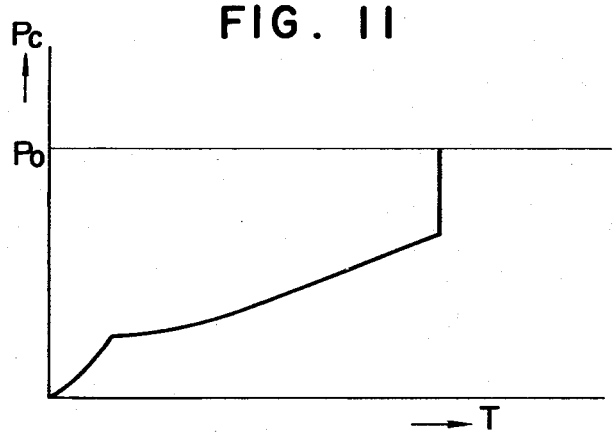
FIG. 11 is a graph illustrating the relationship between the hydraulic pressure $P_0$ to be supplied into the servos of the transmission and the time T.

With the lapse of a certain period of time, the accumulator piston 33 is brought into contact with a shoulder 103 of the accumulator body in the pressure discharging chamber 96. Thus, the movement of the accumulator piston is stopped. At this time, no oil flows to the accumulator chamber 100 through the orifice 42, and therefore the pressure difference between the passage 60 and the passage 61 disappears. As the pressure ni the first pressure receiving chamber 91 of the pressure control valve 31 becomes equal to that in the second pressure receiving chamber 93, the pressure control valve 31 is pushed back by means of the spring 97 and the throttling action of the passage 53 is removed. From this time on, the hydraulic pressure $P_c$ in the servo, i.e., the hydraulic pressure in the passages 57 and 60 increases rapidly to the line pressure $P_o$. The accumulator piston 33 is brought into contact with the end of a land 105 of the pressure return valve 32 and pushes the pressure return valve 32, as shown in FIG. 10. Therefore, the hydraulic oil having the pressure $P_o$ is supplied into the pressure discharging chamber 96 of the accumulator piston 33 through the passage 59, the pressure discharging chamber 95 of the pressure return valve 32 and the passage 65. Thus, the accumulator piston 33 is pushed back by the spring 99 to the condition shown in FIG. 7. An orifice 43 is provided to prevent the pressure in the pressure discharging chamber 95 of the pressure return valve 32 from being dropped when the hydraulic oil having the line pressure $P_o$ is supplied into the pressure discharging chamber 96 of the accumulator piston 33. FIG. 11 graphically illustrates the changes in the hydraulic pressure $P_c$ to be supplied into said servo.

Next, the performance of the accumulator circuit at the time of the shift from the first to the second gear will be described. The performance of the accumulator circuit at this time is the same as in the case of the shift from the N range to the D range first gear. The only exception is that the pressure is discharged from the accumulator circuit in the N range while the accumulator circuit is filled with the hydraulic oil having the line pressure $P_0$ in the first gear. The shift from the first to the second gear is performed by the 1-2 shift valve 34. The passage 60 is connected to the passage 69 and the hydraulic oil having the line pressure $P_0$ in the passage 60 is supplied into the servo 38 of the front brake band 22 which has been released. Therefore, the hydraulic pressure in the passage between the orifice 41 and the servo 38 is decreased to almost zero. Consequently, the pressure return valve 32 is moved from the condition shown in FIG. 7 to the condition shown in FIG. 8, and the pressure in the pressure discharging chamber 96 of the accumulator piston 33 is discharged. Therefore, the accumulator piston 33 is operated, thus performing the same changes as described above. The changes in the hydraulic pressure in the servo 38 of the front brake band 22 are as shown in FIG. 11.

In the case of shifting from the second to the third gear, the performance of the accumulator circuit is the same as in the case of the shift from the first to the second gear. The shift from the second to the third gear is performed by the 2-3 shift valve 35. The passage 76 is connected to the passage 79. The hydraulic oil having the line pressure $P_0$ in the passage 76 is supplied into the servo 39 of the front clutch which has been released. Consequently, the hydraulic pressure in the passage between the orifice 41 and the servo 39 decreases to almost zero. Therefore, the pressure return valve 32 is moved from the condition shown in FIG. 7 to the condition shown in FIG. 8. The accumulator circuit is put into action. The pressure in the servo 39 of the front clutch is changed as shown in FIG. 11. At the time of the downshift from the third to the second gear or from the second to the first, the hydraulic pressure to be supplied into each servo is changed as shown in FIG. 11.

The pressure control valve 31 is not necessarily required to ensure the above-described operation of the accumulator piston 33 at the time of shifting.

Figure 12:
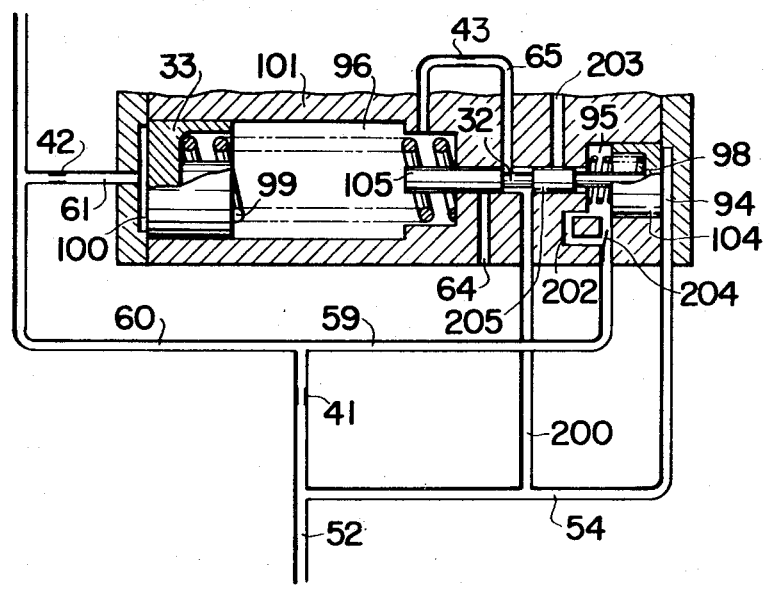
FIG. 12 through 14 illustrate other embodiments of this invention.
Figure 13:
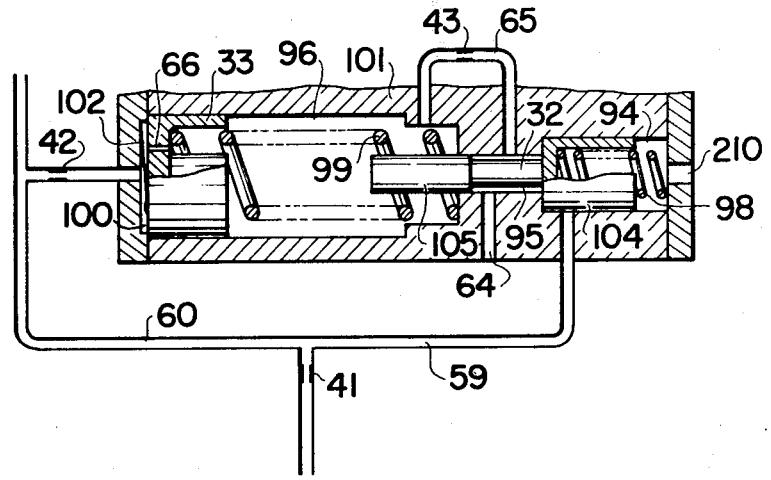

FIGS. 12 and 13 illustrate embodiments wherein the pressure control valve is combined with the pressure return valve 32. In the case of FIG. 12, the operation of the accumulator piston 33 and the pressure return valve 32 at the time of shifting is the same as described above. This embodiment is characterized in that the hydraulic oil to be supplied into the pressure discharging chamber 96 of the accumulator piston 33 passes through the passages 52, 200 and 65 but not through the orifice 41. A passage 202 and a check valve 204 are provided to push back the hydraulic oil in the pressure discharging chamber 95 of the pressure return valve 32 when valve 32 is moved to the left. At this time, a land 205 opens a pressure discharging passage 203 and the check valve 204 closes after a land 104 has closed the passage 59.

FIG. 13 illustrates the condition where all pressures are discharged in the N range. When the manual valve 30 is shifted from this condition to the D range, the accumulator piston 33 is immediately operated, because the pressure in the pressure discharging chamber 96 of the accumulator piston 33 is being discharged from the passages 65 and 64. Then, the accumulator piston 33 is brought into contact with the pressure return valve 32, the passage 64 is closed by the land 105, and the passage 59 is connected to the passage 65, into which the hydraulic oil having the line pressure is supplied. Therefore, the accumulator piston 33 is pushed back by the spring 99. At this time, the pressure return valve 32 overcomes the bias of the psring 98 and compresses spring 98 under the hydraulic pressure. At the time of the shift from the first to the second gear, the hydraulic pressure in the passage 60 decreases to almost zero due to the movement of the shift valve. Consequently, the pressure return valve is immediately pushed back by the spring 98 and the pressure in the pressure discharging chamber 96 of the accumulator piston 33 is discharged. Thus, the accumulator piston 33 starts to operate. This is the same at the time of shifting to other gears.

Figure 14:
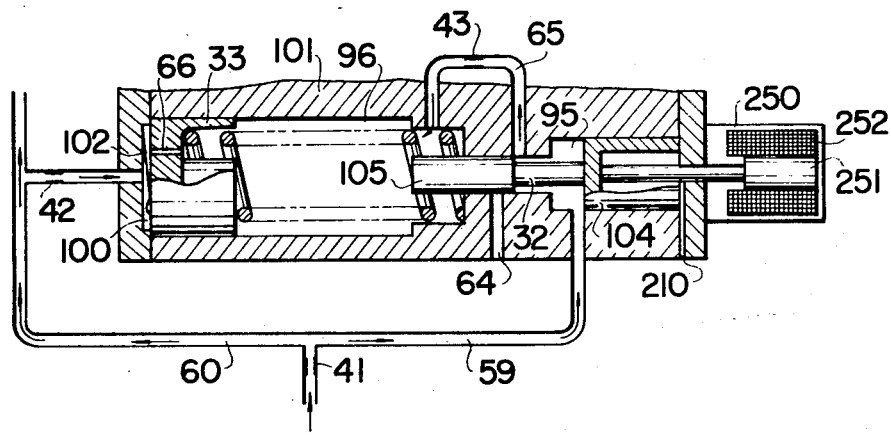
Figure 15:
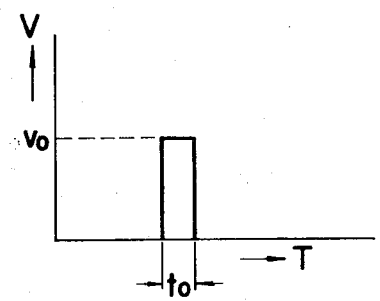
FIG. 15 is a graph illustrating the relationship between the voltage V and the time T.

In the above-described embodiment, the pressure return valve 32 is directly controlled by the hydraulic pressure. It is, however, possible to control this valve electrically. An example embodying such a control is illustrated in FIG. 14. By detecting the change in the shift valve or the change in the hydraulic pressure in the passage 60 and by applying a voltage pulse such as shown in FIG. 15 to a solenoid 250, the pressure return valve 32 is pushed into the accumulator 101 by a solenoid core 251 at the earlier stage of shifting, thus discharging the pressure in the pressure discharging chamber 96 of the accumulator piston 33 and actuating the accumulator piston 33.

As described above, according to this invention, the accumulator is operated for the shift from the N range, where no torque is transmitted onto the engine and the output shaft because of the discharge of the pressure in the servo of the front clutch, to the D range, as well as for the upshift and downshift between the first and second gears and between the second and the third gears. The hydraulic pressure to be supplied into each servo is changed as shown in FIG. 11. Thus, the system according to this invention is quite effective in that the hydraulic pressure can be controlled by a single accumulator circuit at the time of each shifting.

What is claimed is:

1. In a hydraulic control system for automatic transmissions of the type including a change gear mechanism and hydraulically actuated friction elements selectively cooperable with components of the change gear mechanism to establish the input-ouptut gear ratio thereof, the improvement comprising, in combination, respective hydraulic servos for hydraulically actuating each of said friction eelments; at least one shift valve, operable in accordance with engine output and vehicle speed, controlling supply and exhaust of hydraulic fluid relative to said servos; at least one first passage connecting said shift valves to said servos; a source of hydraulic fluid under pressure; a manual transmission position selector valve connected to said source; at least one second passage connecting said selector valve to said shift valves; an accumulator including a piston reciprocable therein and dividing said accumulator into first and second chambers; an accumulator return valve operatively connected to said accumulator; and means connecting said first chamber to said selector valve in parallel with one of said passages to be subjected to the pressure in the latter; said return valve exhausting said second chamber in response to operation of said shift valves and supplying said second chamber with hydraulic fluid under pressure in accordance with displacement of said piston; whereby, upon operation of a shift valve to change said ratio, said piston is displaced to vary the volume of said first chamber to throttle the transient pressure variation of said servos to lessen shock during shifting of said transmission.

2. In a hydraulic control system for automatic transmissions, the improvement claimed in claim 1, in which, one of said first and second passages includes at least one orifice means having a pressure difference produced thereacross by fluid flowing therethrough during gear shifting; said return valve controlling said second chamber in response to said pressure difference.

3. In a hydraulic control system for automatic transmissions, the improvement claimed in claim 1, including a spring biasing said piston in a direction to reduce the volume of said first chamber to a minimum.

4. In a hydraulic control system for automatic transmissions, the improvement claimed in claim 1, including a pressure control valve interposed between said selector valve, on the one hand, and said passages, said accumulator and said return valve, on the other hand.

5. In a hydraulic control system for automatic transmission, the improvement claimed in claim 4, in which said pressure control valve is incorporated in said return valve.

6. In a hydraulic control system for automatic transmissions, the improvement claimed in claim 4, including a first supply line connecting said selector valve to said pressure control valve; an orifice in said first supply line; a second supply line connecting said pressure control valve to said second passage and to said return valve; and a piston included in said pressure control valve and controlling connection of said first supply line to said second supply line.

7. In a hydraulic control system for automatic transmissions, the improvement claimed in claim 6, including a spring biasing said last-mentioned piston to a position establishing substantially unrestricted communication between said first and second supply lines.

8. In a hydraulic control system for automatic transmission of the type including a change gear mechanism and hydraulically actuated friction elements selectively cooperable with components of the change gear mechanism to establish the input-output gear ratio thereof, the improvement comprising, in combination, respective hydraulic servos for hydraulically actuating each of said friction elements; at least one shift valve, operable in accordance with engine output and vehicle speed, controlling supply and exhaust of hydraulic fluid relative to said servos; at least one first passage connecting said shift valves to said servos; a source of hydraulic fluid under pressure; a manual transmission position selector valve connected to said source; at least one second passage connecting said selector valve to said shift valves; an accumulator including a piston reciprocable therein and dividing said accumulator into first and second chambers; an accumulator return valve operatively connected to said accumulator; and means connecting said first chamber to said selector valve in parallel with one of said passages to be subjected to the pressure in the latter; said return valve controlling connection of said second chamber to said selector valve or to exhaust in accordance with displacement of said piston and in accordance with operation of said shift valves; whereby, upon operation of a shift valve to change said ratio, said piston is displaced to vary the volume of said first chamber to throttle the transient pressure variation of said servos to lessen shock during shifting of said transmission; said return valve including a chamber, a piston reciprocable in said chamber, and a piston rod connected to said piston and projecting into said second chamber of said accumulator; a third passage connecting said return valve chamber to said second chamber of said accumulator; a discharge passage connected to said chamber of said return valve; a fourth passage connecting said selector valve to said chamber of said return valve; a spring in said return valve engaging said piston and biasing said piston to a position in which said piston rod connects said third passage to said fourth passage; a second chamber in said return valve on the side of said return valve piston opposite to that engaged by said spring; and a fifth passage connecting said selector valve to said second return valve chamber, orifice means imposed between said selector valve and said fourth passage whereby, upon connection of said fourth and fifth passages to said source through said selector valve, said return valve piston is displaced against the bias of said spring and said piston rod connects said second passage to exhaust through said second chamber of said accumulator; a spring in said second chamber of said accumulator biasing said accumulator piston to a position reducing the volume of said first accumulator chamber to a minimum; said accumulator piston, responsive to connection of said second accumulator chamber to discharge, moving in a direction opposing the bias of said accumulator spring and engaging said piston rod to return said return valve piston to a position in which said piston rod connects said third passage to said fourth passage to increase the pressure in said second accumulator chamber to restore said accumulator piston to its initial position.

9. In a hydraulic control system for automatic transmissions, the improvement claimed in claim 8, including an orifice interposed in said third passage to create a pressure differential thereacross.

10. In a hydraulic control system for automatic transmissions of the type including a change gear mechanism and hydraulically actuated friction elements selectively cooperable with components of the change gear mechanism to establish the input-output gear ratio thereof, the improvement comprising, in combination, respective hydraulic servos for hydraulically actuating each of said friction elements; at least one shift valve, operable in accordance with engine output and vehicle speed, controlling supply and exhaust of hydraulic fluid relative to said servos; at least one first passage connecting said shift valves to said servos; a source of hydraulic fluid under pressure, a manual transmission position selector valve connected to said source; at least one second passage connecting said selector valve to said shift valves; an accumulator including a piston reciprocable therein and dividing said accumulator into first and second chambers; an accumulator return valve operatively connected to said accumulator; and means connecting said first chamber to said selector valve in parallel with one of said passages to be subjected to the pressure in the latter; said return valve controlling connection of said second chamber to said selector valve or to exhaust in accordance with displacement of said piston and in accordance with operation of said shift valves; whereby, upon operation of a shift valve to change said ratio, said piston is displaced to vary the volume of said first chamber to throttle the transient pressure variation of said servos to lessen shock during shifting of said transmission; said means connecting said first passage to aid elector valve in parallel with one of said passages comprising a line connecting said first chamber to said second passage; and an orifice in said line creating a pressure difference thereacross.

References Cited

UNITED STATES PATENTS 3,572,177   3/1971   Ishihara _____ 74—868

C. J. HUSAR, Primary Examiner

U.S. Cl. X.R.

74—868